United States Patent [19]
Sisk

[11] Patent Number: 5,540,465
[45] Date of Patent: Jul. 30, 1996

[54] PIPE, VALVE AND/OR TEE COUPLER

[76] Inventor: David E. Sisk, 7353 Hillsboro Rd., Bonne Terre, Mo. 63628

[21] Appl. No.: 283,828

[22] Filed: Aug. 1, 1994

[51] Int. Cl.⁶ .................................................. F16L 17/025
[52] U.S. Cl. .......................... 285/365; 285/367; 285/420; 285/112
[58] Field of Search ....................... 24/270, 112; 285/365, 285/367, 409, 420; 292/265.69, 247

[56] References Cited

U.S. PATENT DOCUMENTS

| | | | |
|---|---|---|---|
| 957,695 | 5/1910 | Marek | 292/247 |
| 2,731,280 | 1/1956 | Goodliffe et al. | 292/256.69 |
| 3,113,791 | 12/1963 | Frost et al. | 24/270 |
| 3,476,410 | 11/1969 | Pastva, Jr. | 285/365 |
| 3,695,638 | 10/1972 | Blakeley | 285/367 |
| 4,272,871 | 6/1981 | Weinnold | 24/270 |
| 4,311,248 | 1/1982 | Westerlund et al. | 285/365 |
| 5,104,153 | 4/1992 | Corcoran | 285/367 |

*Primary Examiner*—Eric K. Nicholson
*Attorney, Agent, or Firm*—Paul M. Denk

[57] ABSTRACT

A pipe coupler for interconnecting pipes and components together, for transferring bulk and fluid materials, and useful for connecting sections of pipe-end-to-end. The coupler connects grooved pipe to ground pipe, smooth pipe to grooved pipe or smooth pipe to smooth pipe. Also tees, valves, and pipe sections can be secured together. The coupler has an adjustable bail that can be adjusted to assure a tight seal despite any wear. The coupler also eliminates any gaps that may trap material and lead to cross-contamination of subsequent loads.

8 Claims, 6 Drawing Sheets

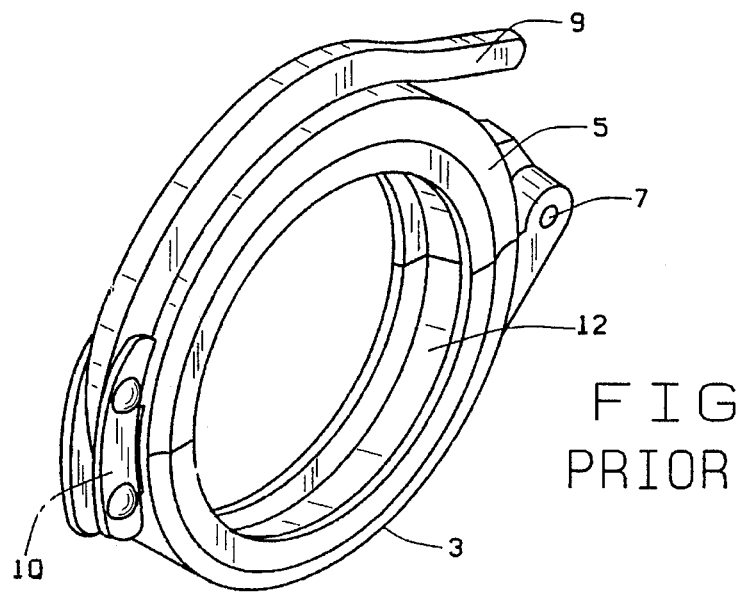
FIG. 1
PRIOR ART
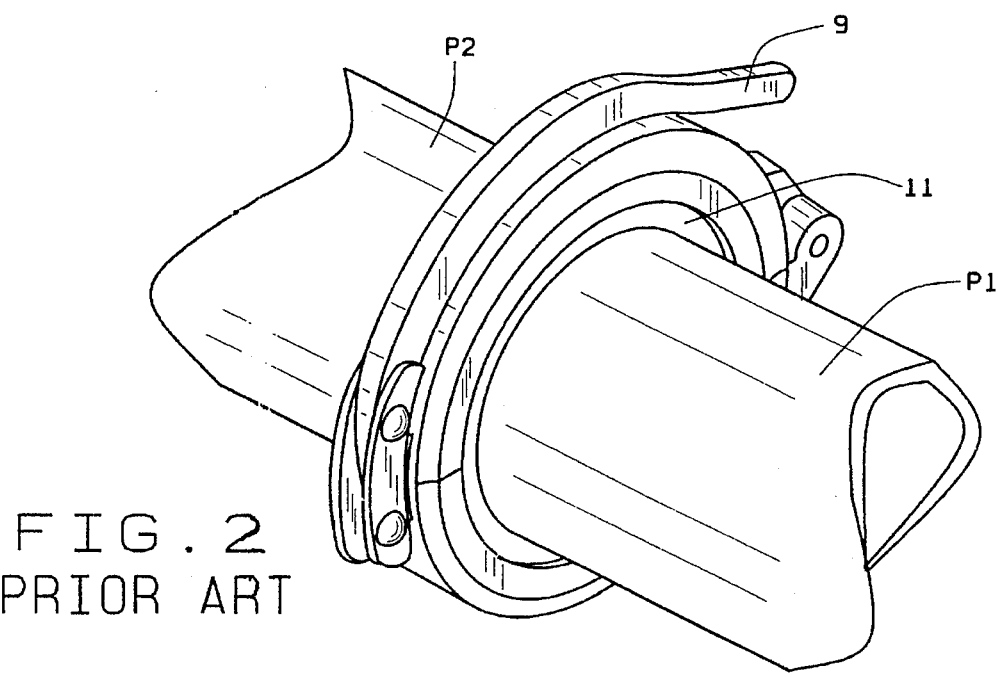
FIG. 2
PRIOR ART
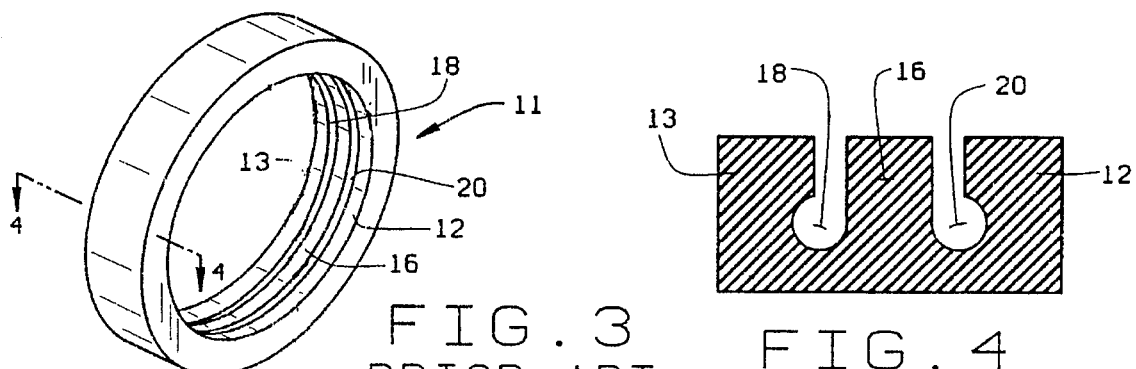
FIG. 3
PRIOR ART
FIG. 4
PRIOR ART

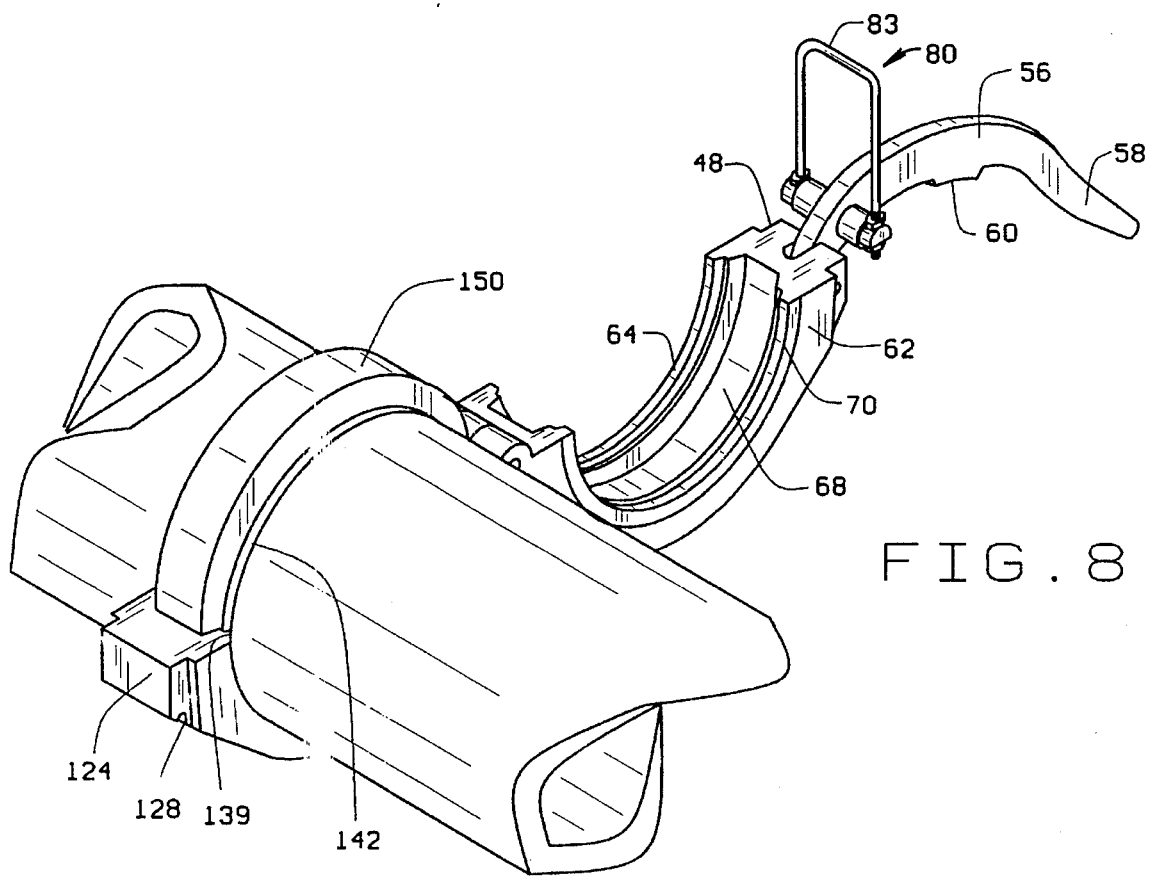
FIG. 8
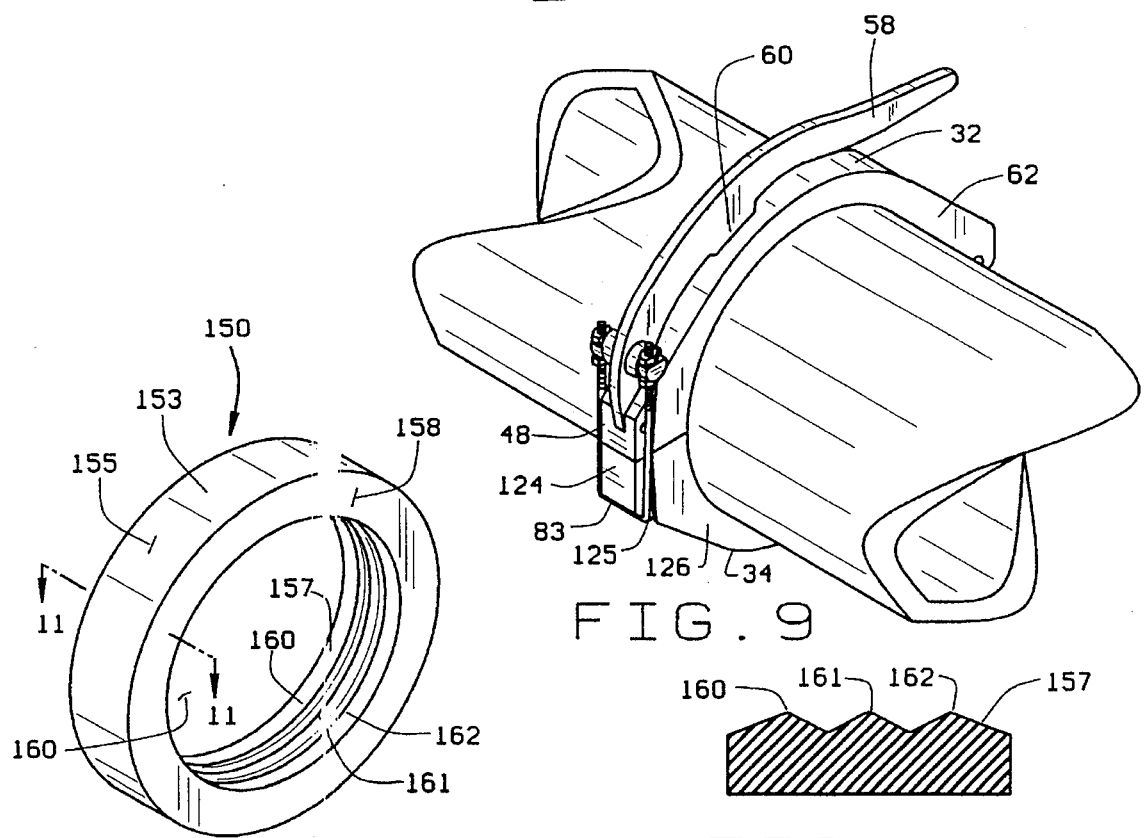
FIG. 9
FIG. 10
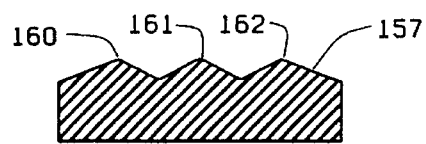
FIG. 11

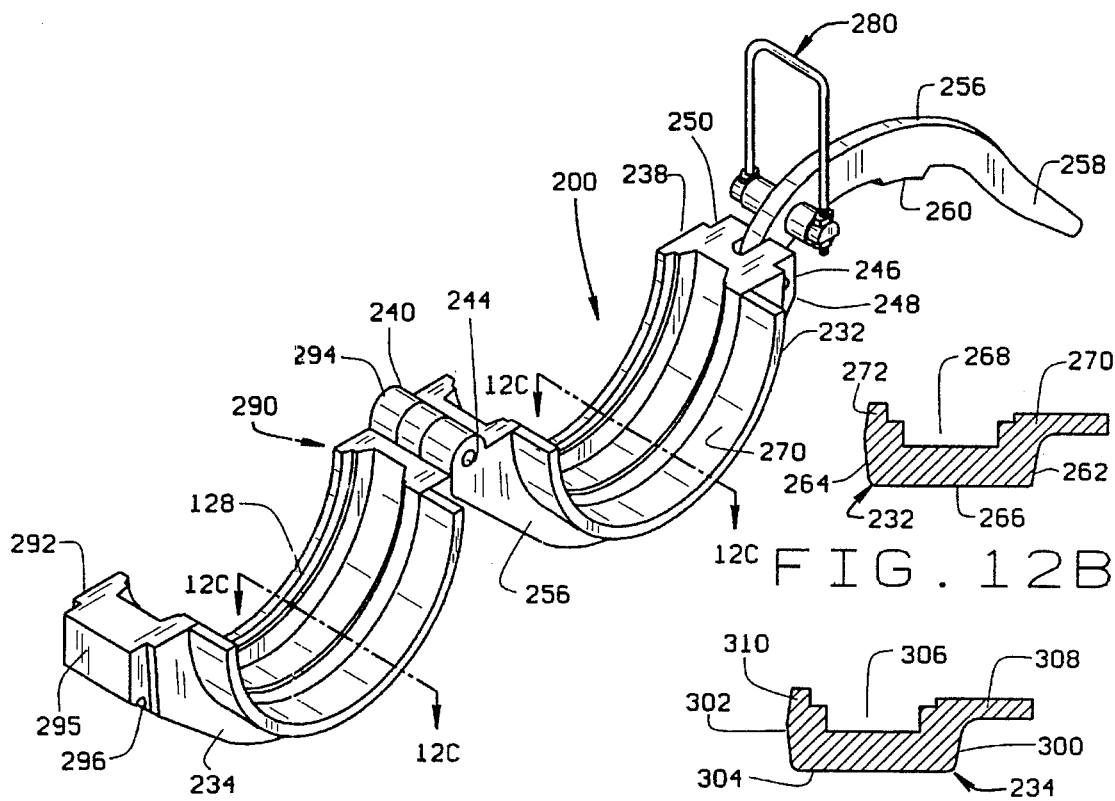
FIG. 12A
FIG. 12B
FIG. 12C
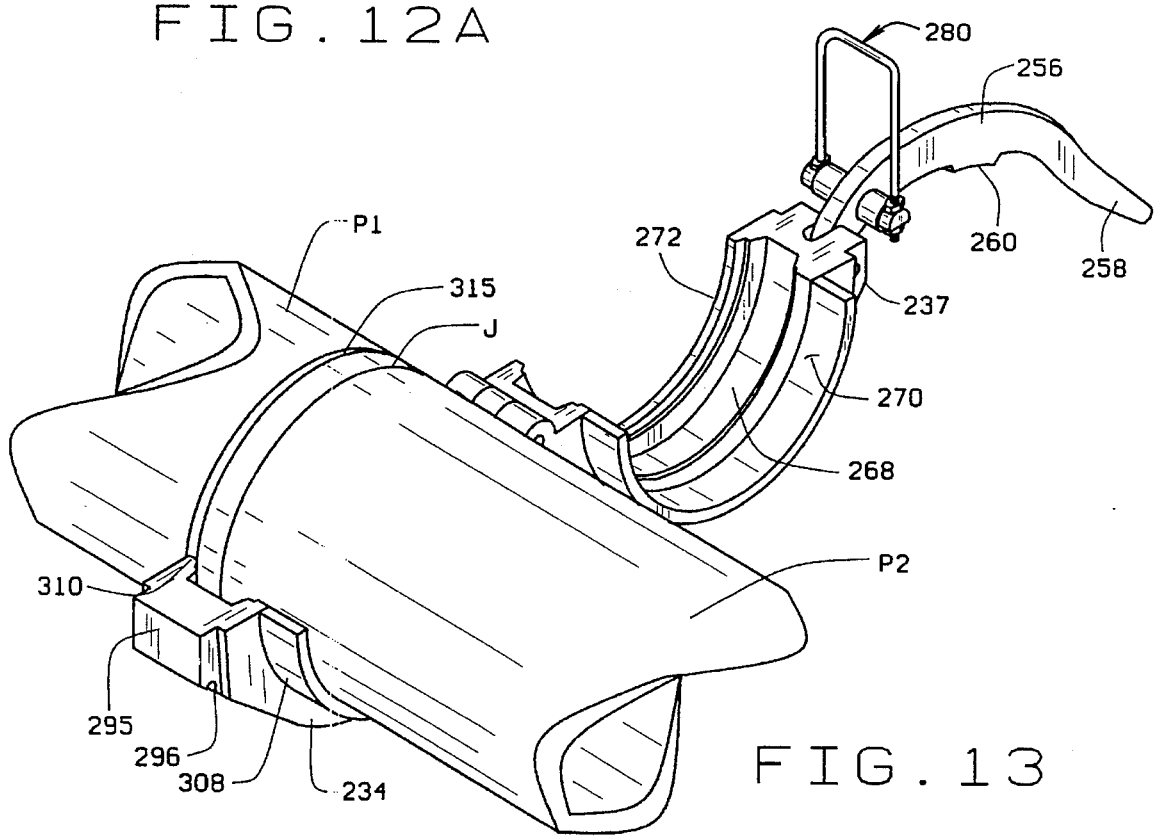
FIG. 13

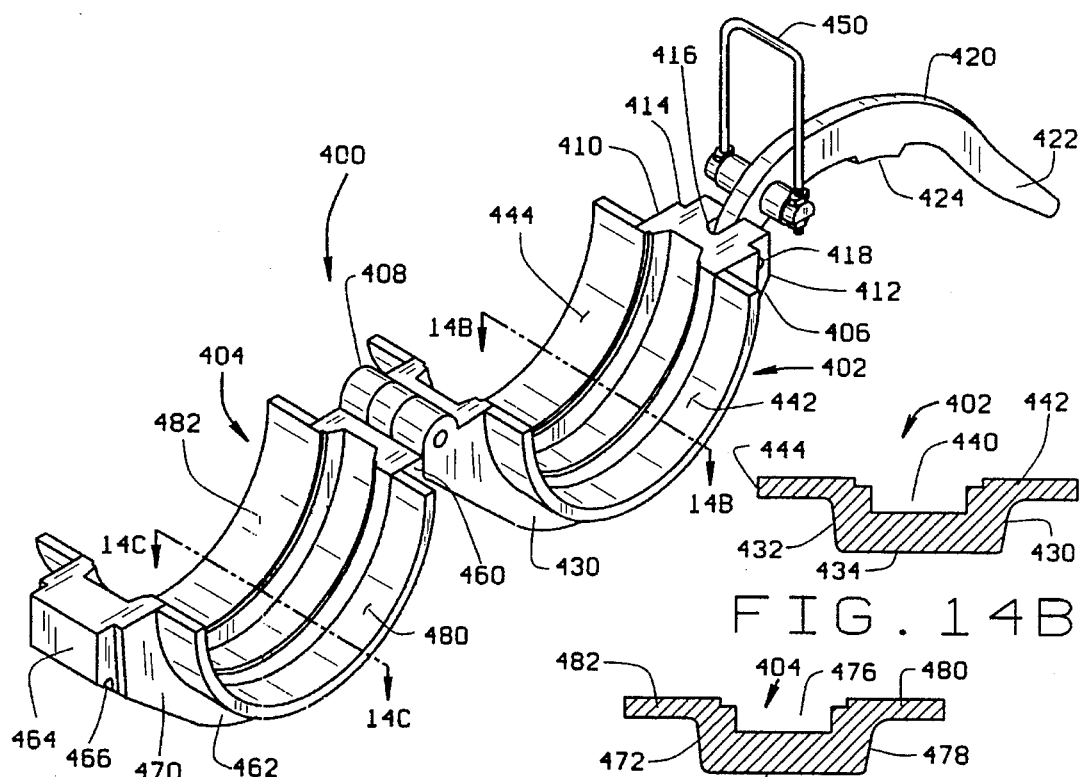
FIG. 14A
FIG. 14B
FIG. 14C
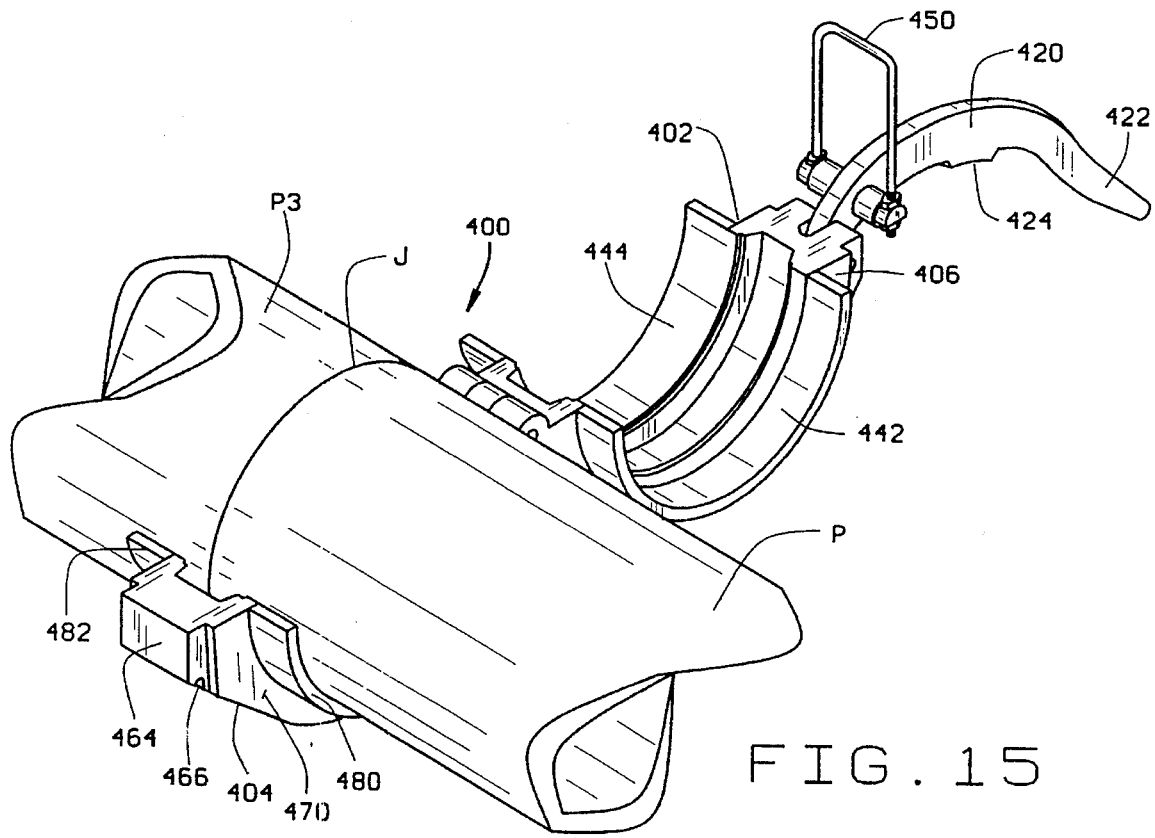
FIG. 15

5,540,465

PIPE, VALVE AND/OR TEE COUPLER

BACKGROUND OF THE INVENTION

This invention relates generally to pipe couplers, more specifically to an adjustable coupler with an improved gasket.

Clamps and couplers used to connect sections of pipe, end-to-end, are known to the art. Such clamps often are employed to connect sections of pipe or hopper tees on tank cars. In certain applications, particularly in dry bulk hauling, the integrity of the seal at the pipe connections is critical in preventing cross contamination of the products sequentially hauled in the tank cars. Often pellets or powders are hauled in the tank cars. The pellets or powders are unloaded through gravity gates valves or hoppers located on the bottom of the tank cars. Hopper tees attached to the bottom of the hopper are connected to collection pipes. Sometimes a vacuum is employed through the pipe to facilitate the emptying of the dry bulk products. All of the dry bulk product must be removed to prevent contamination of subsequent loads. For example, if the hauler is carrying black plastic resin beads, all of the black plastic resin must be removed from the car, as well as the hopper and piping, to prevent contamination of a subsequent white or other colored plastic resin load. Another example is the transportation of edible white flour. If flour is trapped in the tank car or the piping system and develops mold, a subsequent flour load will be exposed to the mold. Obviously, there can be cross contamination of bulk liquids as well as bulk dry loads. Such contamination can destroy a load, force its disposal, and at heavy costs.

It is known in the art that contamination can occur at the point of coupling the pipes and the hopper tees. Prior art clamps employ gasket seals that can trap product. FIGS. 1–4 illustrate components of a typical prior art clamp. Prior art clamp 1 is a typical overcenter clamp having two semi-circular sides 3 and 5 connected by hinge 7. A conventional overcenter lever 9 and cam 10 clamping means is used to draw the two halves tightly together to surround the clamp joint. A deformable gasket 11 lines the interior groove 12 of clamp 1. A deformable gasket of the prior art type is shown in FIGS. 3 and 4. As can be seen, gasket 11 has outer walls 13 and 14 with a center member 16 designed to deform and press against the pipe joint. Gaps 18 and 20 between the respective sides and the middle member create areas in which material, for example, dry bulk material such as plastic resins or flour, can become entrapped. It is nearly impossible to remove such material once it is lodged deep in the gaps 18 and 20.

There are other problems other than cross contamination associated with prior art clamps such as clamp 1. Such prior art clamps have no means for adjustment. The clamp, even when new, can be difficult to open and close. Lever 9 and cam 10 wear during use until clamp 1 loosens and fails. This type of clamp must be changed and discarded, leading to waste and increased costs.

Furthermore, such clamps of the type shown in FIG. 1 are made of cast iron and mild steel parts. Clamp 1 can corrode from exposure to the environment. Once corroded, the clamp is nearly impossible to remove from the pipe P or hopper T. The user must pry lever 9 with a pry bar or length of small diameter pipe. Then the user must beat two halves 3 and 5 apart with a hammer to separate them.

Finally, such clamps are not versatile in that they are not easily adapted to connect different pipe sections together. For example, the clamp may be needed to connect two sections of smooth pipe, connect two section of grooved pipe or connect a smooth pipe to a grooved pipe. Prior art clamps may work to connecting similar pipes, but do not accommodate different styles of pipe.

SUMMARY OF THE INVENTION

It is a principal object of the present invention to provide a pipe coupler having an adjustable clamping bail that can be adjusted to accommodate changes in tolerances due to wear.

Yet another object of the invention is to provide a pipe coupler that can be adapted to connect sections of grooved pipe end-to-end, connect a grooved pipe to a smooth pipe end-to-end, or connect two sections of smooth pipe, end-to-end.

Another object of the present invention is to provide a pipe coupler employing a gasket seal that compresses flush to the pipe sections leaving no spaces or gaps to collect material.

Still another object of the present invention is to provide a gasket seal that provides greater sealing surface and the pipe joint.

Still another object of the present invention is to provide such a pipe coupler made from long lasting corrosion-resistant material.

Yet another object of the present invention is to provide a pipe coupler that requires no tools to couple or uncouple.

Still another object of the present invention is to provide a pipe coupler that is durable, long lasting, economical to manufacture.

In accordance with the invention, briefly stated, a pipe coupler is provided having an adjustable clamping bail and a gap sealing gasket. The coupler has a first and second, semi-circular clamping arms which, together, define an annular opening to encircle the respective ends of the pipes to be joined. The arms are connected with a hinge. The first arm has a cam with a lever. An adjustable clamping bail is connected to the lever. The second arm has a boss to engage the bail when clamped on pipe. The first and second clamping arms each have a generally U-shaped profile defined by a bottom wall and first and second opposed side walls. A sealing gasket seats in a groove between the walls and is compressed by the two halves when the coupler is closed. In one embodiment of the invention each of the clamping arm side walls has a raised rib thereon. The rib engages an annular groove formed in a end of a section of pipe to connect two grooved sections of pipe together. In another embodiment, the first side wall on each arm has a raised rib that engages a grooved pipe and the second side wall on each arm has a smooth flange to engage a smooth end of pipe. This embodiment is used to connect a smooth pipe to a grooved pipe. In a third embodiment, each arm side wall has a smooth flange formed thereon to engage a smooth pipe to connect two smooth ends of pipe together. The inner wall of the gasket has raised ridges with one ridge positioned to seal the pipe joint. As the coupler is installed, it compresses the gasket around the pipe at the joint and spreads the ridges to fill up the inside diameter of the clamp to provide a greater sealing surface at both the pipe joint. The gasket has no gaps or grooves to collect material.

BRIEF DESCRIPTION OF THE DRAWINGS

FIG. 1 is an isometric view of a prior art pipe clamp;

FIG. 2 is an isometric view of a prior art pipe clamp applied to two sections of pipe;

FIG. 3 is an isometric view of a prior art pipe clamp gasket;

FIG. 4 is a cross sectional view of the prior art gasket taken along lines 4—4 of FIG. 3;

FIG. 8 is an isometric view of the pipe coupler of FIG. 6 with an improved gasket of the present invention in place;

FIG. 9 is an isometric view of the pipe coupler of FIG. 7 applied to two sections of pipe;

FIG. 10 is an isometric view of the coupler gasket of the present invention;

FIG. 11 is a cross-sectional view taken along lines 11—11 of FIG. 10;

FIG. 12A is an isometric view of another illustrative embodiment of the pipe coupler of the present invention;

FIG. 12B is a cross-sectional view taken along lines 12B—12B of FIG. 12A;

FIG. 12C is a cross-sectional view taken along lines 12C—12C of FIG. 12A;

FIG. 13 is an isometric view of the pipe coupler of FIG. 12A partially applied to two sections of pipe;

FIG. 14A is an isometric view of another illustrative embodiment of the pipe coupler of the present invention;

FIG. 14B is a cross-sectional view taken along lines 14B—14B of FIG. 14A;

FIG. 14C is a cross-sectional view taken along lines 14C—14C of FIGS. 14A, and

FIG. 15 is an isometric view of the pipe coupler of FIG. 14A partially applied to two sections of pipe.

DESCRIPTION OF THE PREFERRED EMBODIMENT

Figure 5A:
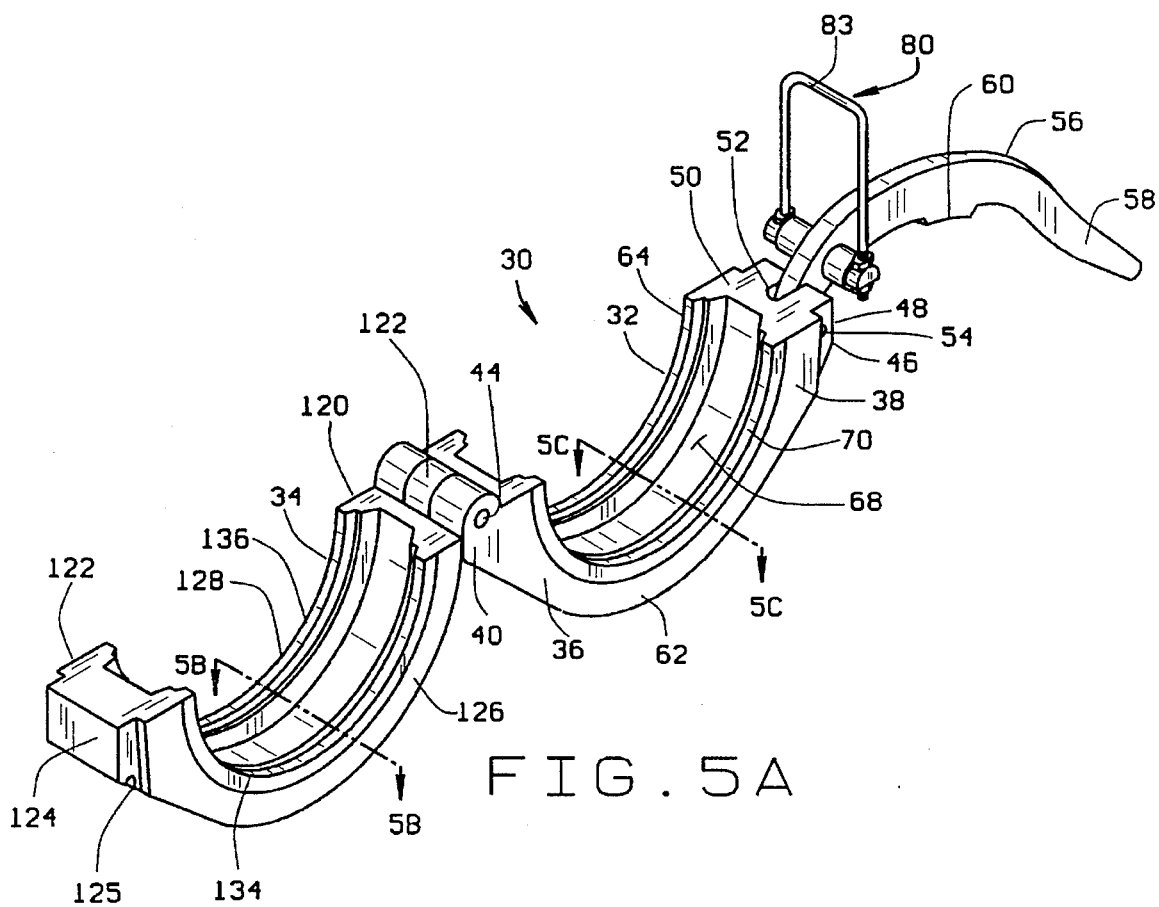
FIG. 5A is an isometric view of one illustrative embodiment of the pipe coupler of the present invention.
Figure 5B:
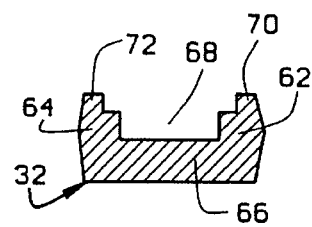
FIG. 5B is a cross sectional view taken across lines 5B—5B of FIG. 5A.
Figure 5C:
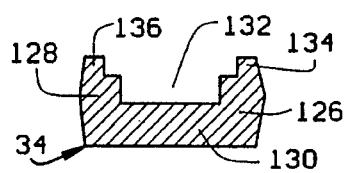
FIG. 5C is a cross sectional view taken along lines 5C—5C of FIG. 5A.
Figure 6:
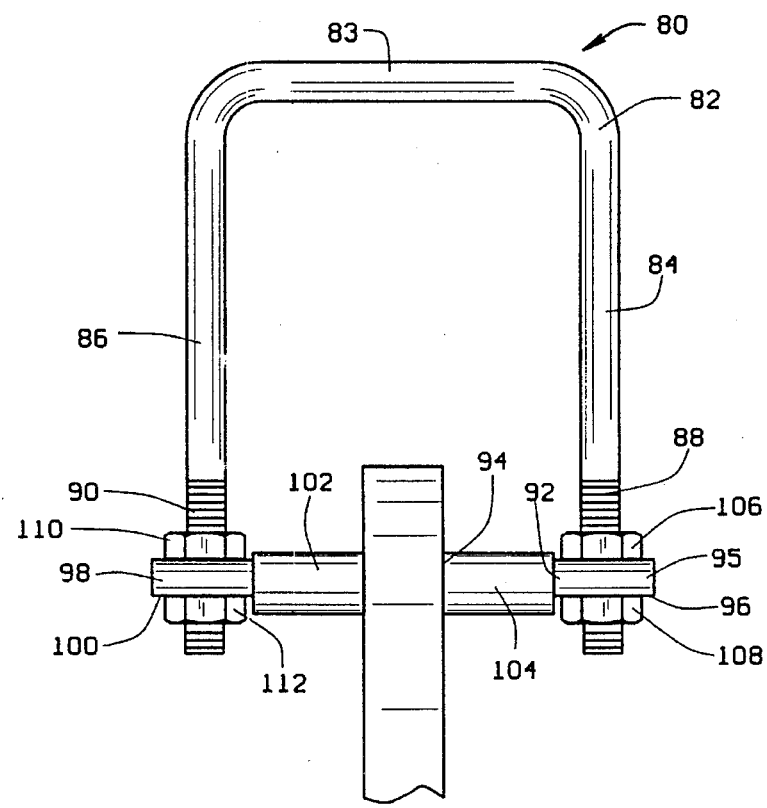
FIG. 6 is an enlarged, front plan of the bail assembly of the pipe coupler of the present invention.

An illustrative embodiment of a pipe coupler of the present invention is indicated generally by reference numeral 30 in FIG. 5 and 6. Coupler 30 has a first clamping arm 32.and a second clamping arm 34. The respective clamping arms are generally semi-circular in profile. First clamping arm 32 has a first end 36 and a second end 38. A hinge portion 40 is integrally formed at the first end. A conventional hole and pin 44 function as the hinge portion. There is a mount 46 at the second end. Mount 46 has a first wall 48 and a second wall 50 defining a space 52. A hole 54 is formed centrally in cam wall 48 and there is a corresponding aligned hole (not shown) in wall 50. A pin (not shown) extends through the holes to form a lever hinge as will now be explained.

A bail lever 56 is pivotally attached to mount 46. Lever 56 is generally arcuate in profile and has a handle section 58 at a first end and a hole (not shown) at a second end. As stated above, the pin 54 is inserted in the mount holes and extends through the hole in the second end of lever 56 to form a hinge. A raised boss 60 is integrally formed on the interior curve of lever 56. As can be seen in FIG. 5B, first clamping arm 32 has a generally U-shaped cross-section. Arm 32 has a first side wall 62, an opposed second side wall 64 and a bottom or base wall 66. The respective walls define a groove 68 to seat a gasket, as will be explained below. First side wall 62 has a raised rib 70 integrally formed thereon. Rib 70 extends the length of wall 62. Second side wall 64 has a raised rib 72 formed thereon. Rib 72 extends the entire length of wall 64.

An adjustable bail assembly 80 is pivotally attached to bail lever 56. Bail assembly 80 is shown in greater detail in FIG. 6. Bail assembly 80 has a generally U-shaped bail 82 with a horizontal section 83 and opposed arms 84 and 86. Bail arm 84 terminates in a threaded portion 88. Arm 86 terminates the threaded portion 90. A pivot rod 92 extends through a hole (not shown) in bail lever 56. A first end 95 of rod 92 has a flat side 96. A second end 98 of rod 92 has a flat side 100. A pair of spacers 102 and 104 are positioned on rod 92 on each side of lever 56. Spacers 102 and 104 can be made out of teflon, plastic, harden rubber or any other appropriate wear-resistant material. A first tightening nut 106 is threadily engaged on threaded portion 88 above rod end 95. Second tightening nut 108 is threadily engaged on the threaded portion 88 below rod end 95. A third tightening nut 110 is threadily engaged on the threaded portion 90 of arm 86 above rod end 98 and a fourth tightening nut 112 is threadily engaged on threaded portion 90 below rod end 98. It should be noted, at this point, that bail 80 and rod 92 as well as the other components, other than the spacers, are made from a harden steel or other appropriate material. The construction of bail assembly 80 allows for the adjustment of bail 80 relative to lever 54. Bail assembly 80 can be tightened by the various tightening nuts to properly adjust the tension on the bail when the coupler is fastened in place even if there are changes in tolerances due to wear.

Second clamping arm 34 has a first end 120 and a second end 122. There is a conventional hinge portion 122 on the first end 120 and designed to cooperate with hinge portion 40 to form a secure hinge. The hinge allows the clamping arms to pivot relative to each other for opening and closing.

A boss 124 is integrally formed at the second end of clamping arm 34. Boss 124 has a groove 125 formed therein to seat horizontal portion 83 of bail 82 when the coupler is closed and locked. As can be best seen in FIG. 5C, arm 34 has a generally U-shaped profile nearly identical to that of arm 32. Arm 34 has a first side wall 126, a second side wall 128 and a bottom wall 130. The respective walls define a groove 132 to seat a gasket as will be explained below. First side wall 126 has a raised rib 134 integrally formed thereon. Rib 134 extends the length of wall 126. Second side wall 128 has a raised rib 136 formed thereon. Rib 136 extends the length of wall 128.

Figure 7:
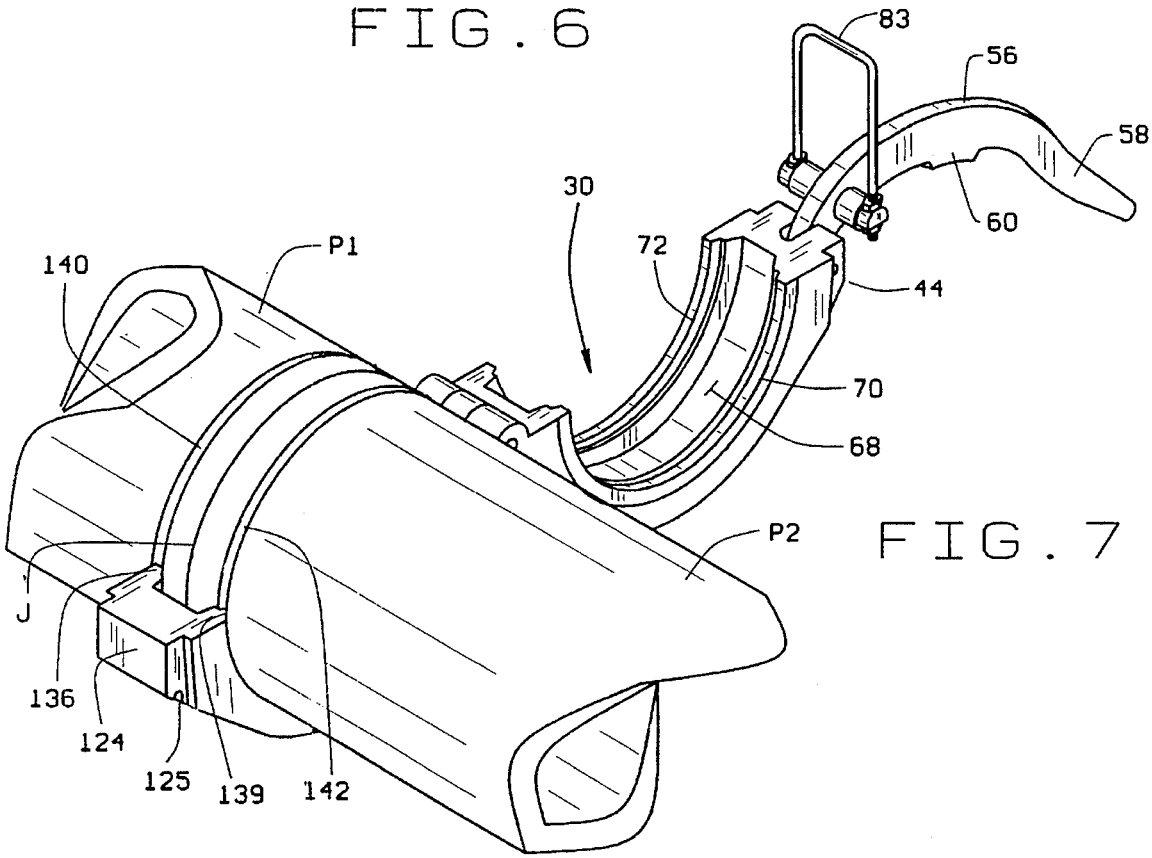
FIG. 7 is an isometric view of the pipe coupler of FIG. 5, partially applied to two sections of pipe.

Coupler 30 is designed to join together two sections of pipe having annular grooves cut in the surface of the respective pipe sections near the joint as best illustrated in FIGS. 7–9 pipe sections P1 and P2 have annular grooves 140 and 142 formed therein near joint J. The respective raised ribs 70, 72, 134 and 136 seat in the corresponding grooves 140 and 142 when the clamping arms 32 and 34 are pivoted about the hinge toward each other. The respective clamping arms encircle joint J. A gasket 150, which will be described in greater detail hereinafter, is seated in grooves 68 and 132 and surrounds joint J. For clarity of illustration, FIG. 7 shows the arrangement of the coupler 30 relative to the pipe sections without gasket 150 in place. FIG. 8 illustrates the arrangement of the coupler and the pipe with gasket 150 in place. As shown in FIG. 9, horizontal section 83 of bail 82 engages groove 125 on boss 124. Lever 54 is pushed down until boss 60 abuts arm 32. Bail 82 is pulled into groove 125, and lever 56 locks down, securing couple 30 in place. Gasket 150 is compressed under the respective clamping arms, as to completely seal joint J. The configuration of the bail 82 and the groove 125 on boss 124 is such as to allow a lesser leverage pressure required to manipulate the lever 56 to lock and unlock the coupler during its usage and applications.

Gasket 150 is shown in greater detail in FIGS. 10 and 11. Gasket 150 is made from a deformable, impervious material such as rubber, or polymer. Gasket 150 has an annular body 153 with an outer surface 155 and an inner surface 157 with a material thickness 158 inbetween. Inner surface 157 defines internal bore 160. Inner surface 157 has three symetrical ridges 160, 161 and 162 integrally formed as a serration like surface thereon. The middle ridge 161 is positioned to align with pipe joint J. Since gasket 150 is made of a deformable material, the ridges 160–162 compress and flatten when the coupler is closed and locked. The compression flattens and spreads ridges 160–162 and seals joint J. There are no gaps.

Another illustrative embodiment of the coupler of the present invention, is shown in FIGS. 12A–13 and is indicated, generally, by reference numeral 200. Coupler 200, as will be appreciated by those skilled in the art, is designed to connect two sections of pipe, one section having a smooth end surface and the other having an annular groove cut in the surfaces. Coupler 200 has a first clamping arm 232 and a second clamping arm 234. The respective clamping arms are generally semi-circular in profile. First clamping arm 232 has a first end 236 and a second end 238. A hinge portion 240 is integrally formed at the first end. A conventional hole and pin 244 function as a hinge. There is a cam 246 at the second end. Cam 246 has a first wall 248 and an opposed second wall 250. A pin (not shown) extends through the holes to form a lever hinge, as will now be explained. A bail lever 256 is pivotally attached to cam 244. Lever 256 is generally arcuate and profile having a handle portion 258 at a first end and a hole (not shown) at a second end. As stated above, pin 244 extends through the holes in the hinge portion and through the hole (not shown) in the second end of the lever 256 to form a hinge for the pivotal movement of bail lever 256. A raised boss 260 is integrally formed on the interior curvature of lever 256.

As can be seen in FIG. 12B, first clamping arm 232 has a generally U-shaped cross-section. Arm 32 has a first side wall 262, a second side wall 264 and a bottom wall 266. The respective walls define a groove 268 to seat a gasket, as previously explained relative to coupler 30. First side wall 262 has an integral flange 270 which protrudes outwardly from side wall 262 and also extends the length of wall 262. Second side wall 264 has a raised rib 272 integrally formed thereon. Rib 272 extends the entire length of wall 264. An adjustable bail assembly 280 is pivotally attached to bail lever 256. Bail assembly 280 is identical in construction and function to bail 80, as previously described with reference to coupler 30 above.

Second clamping arm 234 has a first end 290 and a second end 292. There is a conventional hinge portion 294 on first end 290 that cooperates with hinge portion 240 to form a conventional hinge, as previously explained. A boss 295 is integrally formed at the second end of arm 234. Boss 295 has a groove 296 formed therein to seat the bail when the coupler is locked, as previously described. As can best seen in FIG. 12C, arm 234 has a generally U-shaped profile which is a mirror image of that of arm 232. Arm 234 has a first side wall 300, second side wall 302 and a bottom wall 304. The respective walls define a groove 306 to seat a gasket. Obviously, in usage, a gasket as previously described, will fit within the coupler. First side wall 300 has an integral flange 308 integrally formed thereon. Flange 308 protrudes out from wall 300 and extends the length of wall 300. Second side wall 302 has a raised rib 310 formed thereon. Rib 310 extends the length of wall 302.

Coupler 200 is designed to join together segments of pipe, one having an annular groove machined in the surface near the joint and the other having a smooth surface, as illustrated in FIG. 13. Pipe section P1 has an annular groove 315. The raised ribs 272 and 310 seat in the groove 315. Flange 270 and 308 protrudes outwardly from the respective arm walls and abut the smooth end of pipe P2. Coupler 200 is shown without a gasket in FIG. 13 for clarity of illustration. However, in use, a gasket, as illustrated in FIG. 10, is placed around pipe joint J and seats in the respective grooves between the respective clamping arm side walls.

FIGS. 14A through 15 shown another illustrative embodiment of the pipe coupler of the present invention, for use in coupling two ends of smooth and ungrooved pipe sections together. Indicated generally by reference numeral 400. Coupler 400 has a first clamping arm 402 and a second clamping arm 404. The respective arms are generally semi-circular in profile. First clamping arm 402 has a first end 406 and a second end 408. First end 406 has a conventional hinge arrangement as previously described with reference to the other illustrative embodiments. There is a cam 410 at the second end. Cam 410 has a first wall 412 and a second wall 414 defining space 416. A hole 418 is formed centrally in cam 48 and there is a corresponding hole (not shown) in cam wall 414 (not shown). A pin (not shown) extends through the hole to form a lever hinge as previously explained. A bail lever 420 is pivotally attached to cam 406. Lever 420 is generally arcuate and profile, as previously explained, and has a handle section 422. As stated above, a hole in the second end of the lever fits into cam 406 in a hinge-like arrangement. Raised boss 424 is integrally formed on the internal curve of the lever.

As can been seen in FIG. 14B, first clamp arm 402 has a generally U-shaped cross section. Arm 402 has a first side wall 430, a second side wall 432 and a bottom wall 434. The respective walls define a groove 440. Groove 440 is disposed to seat a gasket as previously explained. First side wall 430 has an integral flange 442 formed thereon and protruding outwardly from side wall 430. Flange 442 extends the length of wall 430. Second side wall 432 has an integral flange 444 formed thereon, protruding outwardly from wall 432 and extending the length of wall 432. The coupler 400 has an adjustable bail assembly, shown generally at 450, which is identical to bail assembly 80 previously described. Second clamping arm 34 has a first end 460 and a second end 462. There is a conventional hinge type apparatus connecting the respective first ends of the clamping arms as previously described with reference to the other embodiments. A boss 464 is integrally formed on the second end of arm 404. Boss 464 has a groove 466 to seat the bail when the coupler is locked as previously described. As can be best seen in FIG. 14C, arm 404 has a generally U-shaped profile nearly identical to that of arm 402. Arm 404 has a first side wall 470, a second side wall 472 and a bottom wall 474 the respective walls define a groove 476 for the seating of a gasket as previously explained. First side wall 670 has an integral flange 480 formed thereon and protruding out from side wall 470. Flange 480 extends the length of wall 470. Side wall 472 has a flange 482 integrally formed thereon and protruding outwardly from the wall. Coupler 400 is designed to join two sections of smooth pipe, as illustrated in FIG. 15. Coupler 400 is shown without a gasket for clarity of illustration. The respective flanges 442, 444, 480 and 480 abut the smooth surfaces of pipes P3 and P4 to secure them together.

It will be appreciated by those skilled in the art that various changes and modifications can be made in the coupler without departing from the scope of the appended claims. Furthermore, the various couplers are shown connecting sections of pipe. It will be understood that the coupler is intended to join sections of pipe to hopper tees. Both grooved and smooth, as well as connecting sections of conventional pipe.

Therefore, the foregoing description and accompanying drawings are intended to be illustrative only and should not be construed in a limiting sense.

I claim:

1. A coupler for connecting two sections of pipe, end-to-end, comprising:

a first and second semi-circular clamping arm, each said clamping arm having a first end portion and a second end portion;

each said first end portion connected together to allow for pivotal movement of said arms;

a mounting means on the second end portion of said first arm;

a bail lever attached to said mounting means, said bail lever having sides, and a pivotal spacer means extending from each side of the bail lever and being mounted to said bail lever;

a bail assembly attached to said extending pivotal spacer means, said bail assembly having a generally U-shaped configuration, and capable of pivoting generally in alignment with a plane formed between the ends of the two contiguous pipe sections when coupled;

said bail assembly being adjustable in its attachment to the spacer means;

a boss on the second end of said second arm for accepting said bail assembly;

each said first and said second arms having a generally U-shaped cross section with a first side wall and a second side wall defining a groove for seating of a gasket;

said first and second side walls of each said arm having a raised rib formed thereon, each said rib disposed to seat in an annular groove formed approximate an end of a section of pipe.

2. The invention of claim 1 wherein said bail assembly is adjustable in its connection with the spacer means to accommodate changes in tolerances due to wear of said coupler.

3. The coupler of claim 1 wherein said clamping arms and said lever are formed from an aluminum alloy.

4. The coupler of claim 1 wherein said bail assembly is made of stainless steel.

5. The coupler of claim 1 having a gasket seated in said groove, said gasket having a generally annular shape with an outer and an inner wall, said inner wall defining a bore, said outer wall being smooth so as to seat in said groove and said inner wall having a plurality of ridges.

6. A coupler for connecting two sections of pipe, end-to-end comprising:

a first and second semi-circular clamping arm, each said clamping arm having a first end portion and a second end portion; each said first end portions connected together to allow for pivotal movement of said arms;

a cam means on the second end portion of said first arm;

a lever attached to said cam means, said lever having sides, and a pivotal spacer means extending from each side of the lever and being mounted thereto;

a bail assembly pivotally attached to said spacer means, said bail assembly having a generally U-shaped configuration;

said bail assembly capable of pivoting generally in alignment with a plane formed between the ends of the two contiguous pipe sections when coupled;

said bail assembly being adjustable in its attachment to the spacer means;

a boss on the second end of the second arm for accepting said bail assembly;

each said first and said second clamping arm having a generally U-shaped cross-section with a first side wall and a second side wall defining a groove for seating a gasket;

said first side wall of each arm having a smooth flange formed thereon for the seating of a smooth end of a section of pipe and said second side wall of each arm having a smooth flange formed thereon for the seating of a smooth end of a section of pipe.

7. A coupler for connecting two sections of pipe or a section of pipe to an adjustable hopper T, end-to-end comprising:

a first and second semi-circular clamping arm, each said clamping arm having a first end portion and a second end portion;

each said first end portions connected together to allow for pivotal movement of said arms;

a cam means on the second end portion of said first arm, and a lever pivotally attached to said cam means;

said lever having sides, and a pivotal spacer means extending from each side of the lever and being mounted to the said lever;

a bail assembly attached to said extending pivotal spacer means, said bail assembly having a generally U-shaped bail, and capable of pivoting generally in alignment with a plane formed between the ends of the two sections of pipe or a section of pipe to a hopper T when coupled;

said bail assembly being adjustable in its attachment to the spacer means;

a boss on the second end of said second arm for accepting said bail;

each said first and said second clamping arm having a generally U-shaped cross-section with a first side wall and a second side wall defining a groove for seating a gasket;

said first side wall of each said arm having a raised rib formed thereon, each rib disposed to seat in an annular groove in an end of a section of pipe and said second side wall of each arm having a smooth flange formed thereon for the seating of a smooth end of a section of pipe.

8. The invention of claims 1, 6 or 7, wherein said bail assembly being generally U-shaped, formed having a pair of arms each terminating in a threaded portion, the threaded portion of each bail arm extending through said spacer means, and an adjustable fastener securing to each bail arm and capable of adjusting the U-shaped bail with respect to the lever to which it pivotally attaches for adjusting the tensioning on the bail when the coupler is fastened in place around the pipe ends.

* * * * *